United States Patent

Ross

[11] Patent Number: 5,168,957
[45] Date of Patent: Dec. 8, 1992

[54] VEHICLE THEFT DETERRENT APPARATUS AND METHOD

[76] Inventor: Gilbert B. Ross, 17640 Vincennes St., Northridge, Calif. 91324

[21] Appl. No.: 716,642

[22] Filed: Jun. 17, 1991

[51] Int. Cl.⁵ .................. B60R 25/04; B60K 28/00
[52] U.S. Cl. ........................... 180/287; 123/198 DB
[58] Field of Search .............. 180/287, 272, 69.4; 123/198 DB

[56] References Cited

U.S. PATENT DOCUMENTS

| | | | |
|---|---|---|---|
| 2,881,789 | 4/1959 | Finazzo | 180/287 X |
| 3,550,717 | 12/1970 | Doty, Jr. | 180/287 X |
| 3,687,216 | 8/1972 | Tracy | 180/287 |
| 3,700,063 | 10/1972 | Dunseath | 180/287 |
| 3,834,484 | 9/1974 | Sangster | 180/287 |
| 3,907,060 | 9/1975 | Burton et al. | 180/287 |
| 3,910,372 | 10/1975 | Mozzar | 180/287 |
| 4,133,410 | 1/1979 | Krusoe | 180/287 |
| 4,495,910 | 1/1985 | Taylor | 123/198 DB |

FOREIGN PATENT DOCUMENTS

| | | | |
|---|---|---|---|
| 2596710 | 10/1987 | France | 180/287 |
| 2620398 | 3/1989 | France | 180/287 |
| 469957 | 8/1937 | United Kingdom | 180/287 |

Primary Examiner—Charles A. Marmor
Assistant Examiner—Tamara L. Graysay
Attorney, Agent, or Firm—Louis J. Bachand

[57] ABSTRACT

A vehicle theft deterrent diverts engine fuel into a controlled bypass which is openable only by an authorized user of the vehicle code-signaling a controller to actuate a solenoid operated plug to open the bypass for flow of fuel to the engine.

23 Claims, 3 Drawing Sheets

VEHICLE THEFT DETERRENT APPARATUS AND METHOD

FIELD OF THE INVENTION

This invention relates to apparatus and method of deterring vehicle theft, and more particularly, to controlling fuel flow to the engine as a means of limiting unauthorized use of the vehicle.

BACKGROUND

Auto theft is a common occurrence; alarms and ignition kill switches have been developed, but have not proved adequate against organized car theft. Brazen hold-ups of drivers is an increasingly common form of car stealing. In such circumstances, key-dependent devices are of little use. Such devices are also expensive to very expensive depending on sophistication.

There exists accordingly a need for car theft deterrent devices which are effective in the absence of the owner, and despite the thief having the car ignition key. Car tracking systems are being offered but are too costly except for the most expensive of automobiles. But, the great bulk of cars stolen are of only moderate cost, making tracking devices too expensive for use.

SUMMARY OF THE INVENTION

It is accordingly an object of the invention, to provide a car theft deterrent in which the fuel supply to the vehicle engine is interrupted, limiting drastically the speed and distance a car can achieve. It is another object to provide a car theft deterrent which is simple in design, easy and inexpensive to install, rugged, reliable, and simple to operate. It is a specific object of the invention to provide a controllable bypass of the vehicle fuel system which blocks fuel to the engine unless a coded authorization is given to unlock the system.

These and other objects of the invention to become apparent hereinafter are realized in a vehicle theft deterrent apparatus for liquid fuel powered vehicles having an engine, a liquid fuel supply and a fuel line defining a fuel path between the engine and the fuel supply, the apparatus comprising a bypass, means redirecting the fuel path through a bypass, and means to close the bypass in the absence of a signal of authorized use.

In this and like embodiments: the fuel redirecting means includes a fuel line plug substantially blocking the fuel line in favor of the bypass; the fuel redirecting means further includes a housing attached to the fuel line, the housing having entry and exit ports registerable with openings made in the fuel line on opposite sides of the fuel line plug, the bypass extending between the ports, and the bypass closing means closing the bypass; the engine is an internal combustion engine and the fuel is a hydrocarbon fuel; the bypass closing means comprises a bypass plug blocking fuel flow through the bypass; the bypass closing means is electrically movable; the bypass closing means comprises a solenoid operated plunger carrying the bypass plug; there is also included a controller responsive to a signal of an authorized use condition of the vehicle to actuate a signal to the bypass closing means to open the bypass, and input means to the controller for input of an authorization code into the controller.

In this and like embodiments also, the fuel line has a given height dimension and given cross-sectional area, the bypass having substantially the same cross sectional area as the fuel line but a substantially lower height, and the bypass closing means comprises a solenoid operated plunger carrying a bypass plug, the solenoid having a travel distance capability sufficient to carry the plug across the height of the bypass to have the secondary plug traverse the bypass to interfit with the exit port opening, the travel distance being less than the height of the fuel line.

In a more particularly preferred embodiment, there is provided a vehicle theft deterrent apparatus for liquid fuel powered vehicles having an engine, a liquid fuel supply, and a fuel line defining a fuel path between the engine and the fuel supply, the fuel line being selectively apertured with forward, rearward and center apertures along the fuel path, the apparatus being mounted to the fuel line and comprising a housing defining a bypass for the fuel line with entry and exit ports arranged to register with the forward and rearward fuel line apertures, and primary plug means inserted in the fuel line central aperture for redirecting fuel from the fuel line into the bypass entry port, secondary plug means carried by the housing and movable between bypass closing and bypass opening positions, and control means acting on the secondary plug means responsive to a predetermined signal of the existence of a condition of authorized vehicle use to open the bypass to fuel flow and conversely to not open the bypass to fuel flow in the absence of the signal, whereby the vehicle engine is inoperable for lack of sufficient fuel in the absence of an authorized use condition being signaled.

In this and like embodiments: the primary plug means is carried by the housing; there is further included mounting shoulders attached to the housing and adapted to mount the housing to the fuel line; there is further included a solenoid operated plunger carrying the secondary plug means for movement responsive to the control means; the plunger is enclosed within a nonconductive sleeve having conductive end caps; the housing exit port includes a recessed opening outward from the bypass within the housing, the secondary plug means being conformed to interfit with the exit port opening; the bypass has substantially the same cross-sectional area as the fuel line, but a lower height; and, the secondary plug means is carried on a solenoid operated plunger for travel a distance substantially the same as the height of the bypass, the travel distance being less than the height of the fuel line.

In a still more particularly preferred embodiment of the invention, the mounting shoulders attached to the housing and adapted to mount the housing to the fuel line, the solenoid operated plunger carries the secondary plug means for movement responsive to the control means, the plunger being enclosed within a nonconductive sleeve having conductive end caps, the housing exit port includes a recessed opening outward from the bypass within the housing, the secondary plug means being conformed to interfit with the exit port opening, and the secondary plug means is clear of said bypass in the bypass open condition of said apparatus.

In a further particularly preferred embodiment of the invention there is provided a vehicle theft deterrent apparatus comprising a generally rectangular body forming a housing having a first chamber within which there is located a solenoid operated plunger, the plunger carrying an exit port plug, a longitudinally adjacent second chamber within which there is located a controller, and a laterally adjacent, elongated third chamber comprising a fuel bypass and having spaced apart exit and entry ports extending through and from a longitudinal side wall of the housing, the exit port being opposed to the exit port plug carried on the plunger, the housing being inwardly recessed along its the longitudinal side wall to bodily receive a fuel line, a fuel line-blocking plug formed within the recessed housing wall in line with the housing entry and exit ports and therebetween, the plug being adapted to substantially restrict fuel flow in the fuel line when inserted in the fuel line in a first opening made therein, the entry and exit ports being registerable with separate second and third openings made in the fuel line, the fuel line plug acting to redirect fuel line fuel into the third chamber via its entry port, the fuel exiting the third chamber via its exit port in an authorized use condition of the vehicle, and corresponding retracted position of the exit port plug but not exiting the third chamber in a nonauthorized use condition of the vehicle and corresponding extended position of the exit port plug into the exit port, and means determining the use authorization condition of the vehicle comprising an authorization code input device, and means to generate a signal to retract the solenoid operated plunger and exit port plug carried thereon to open the elongated chamber to fuel flow in bypassing relation around the fuel line plug in response to entry of a predetermined code, but not otherwise.

In the method aspects of the invention, there is provided a method of deterring theft of vehicles having an engine and a fuel supply line thereto, including locally diverting substantially all the fuel from the supply line, passing the fuel along a selectively interruptible passage back to the line to the engine, and interrupting the passage unless signaled by a coded instruction that the vehicle use is authorized.

THE DRAWING

The invention will be further described in conjunction with the attached drawing in which.

PREFERRED MODES

As will be evident from the foregoing, under the invention, the conventional liquid hydrocarbon fuel supply line to the e.g. internal combustion engine of a vehicle: car, truck, bus, construction equipment, stationary engines, etc. is selectively interruptible by interposing a plug in a bypass around another plug permanently mounted in the vehicle fuel supply line. It is believed the apparatus will prove very difficult for thieves to defeat because the fuel line is permanently modified and removal of the apparatus will not make the car operable without further repairs to the fuel line itself, all of which must be accomplished under the car.

The materials of construction of the present apparatus are not narrowly critical. Parts coming into contact with the fuel should be resistant to deterioration by hydrocarbon or other employed fuel. Since the apparatus is installed on the vehicle chassis, albeit preferably in the channels thereof, it should be rugged against damage from vibration, road hazards and environmental attack. Engineering plastics resistant to hydrocarbons will be the preferred materials. The apparatus housing is conveniently molded in two mating halves for insertion of the solenoid and microprocessor signal generator; the housing halve are then sealed together permanently.

Figure 1:
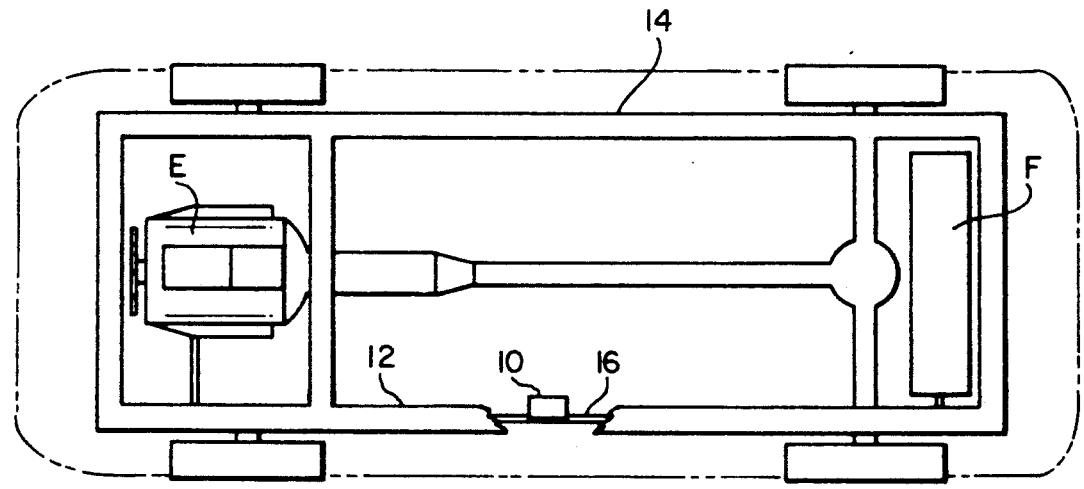
FIG. 1 is a partly schematic plan view of the invention apparatus installed on a vehicle.

With reference to FIG. 1, the apparatus 10 is mounted in the left rail 12 of vehicle chassis 14 by attachment to the fuel line 16 between engine E and fuel supply F. Installation is easy once access to the fuel line is obtained. An out-of-the way installation is to be preferred to make it more difficult for thieves to locate and attempt to defeat the device. As more particularly described below, the fuel line is pierced in three places to install the apparatus 10, one for the apparatus inlet to register with, one for the apparatus exit to register with and one for the fuel line plug to enter for purposes of blocking the fuel line and diverting fuel into the apparatus 10 where it can be controlled as a function of its use condition being authorized or unauthorized. If the apparatus 10 is removed the fuel line 16 is still breached and the vehicle remains unusable.

Figure 2:
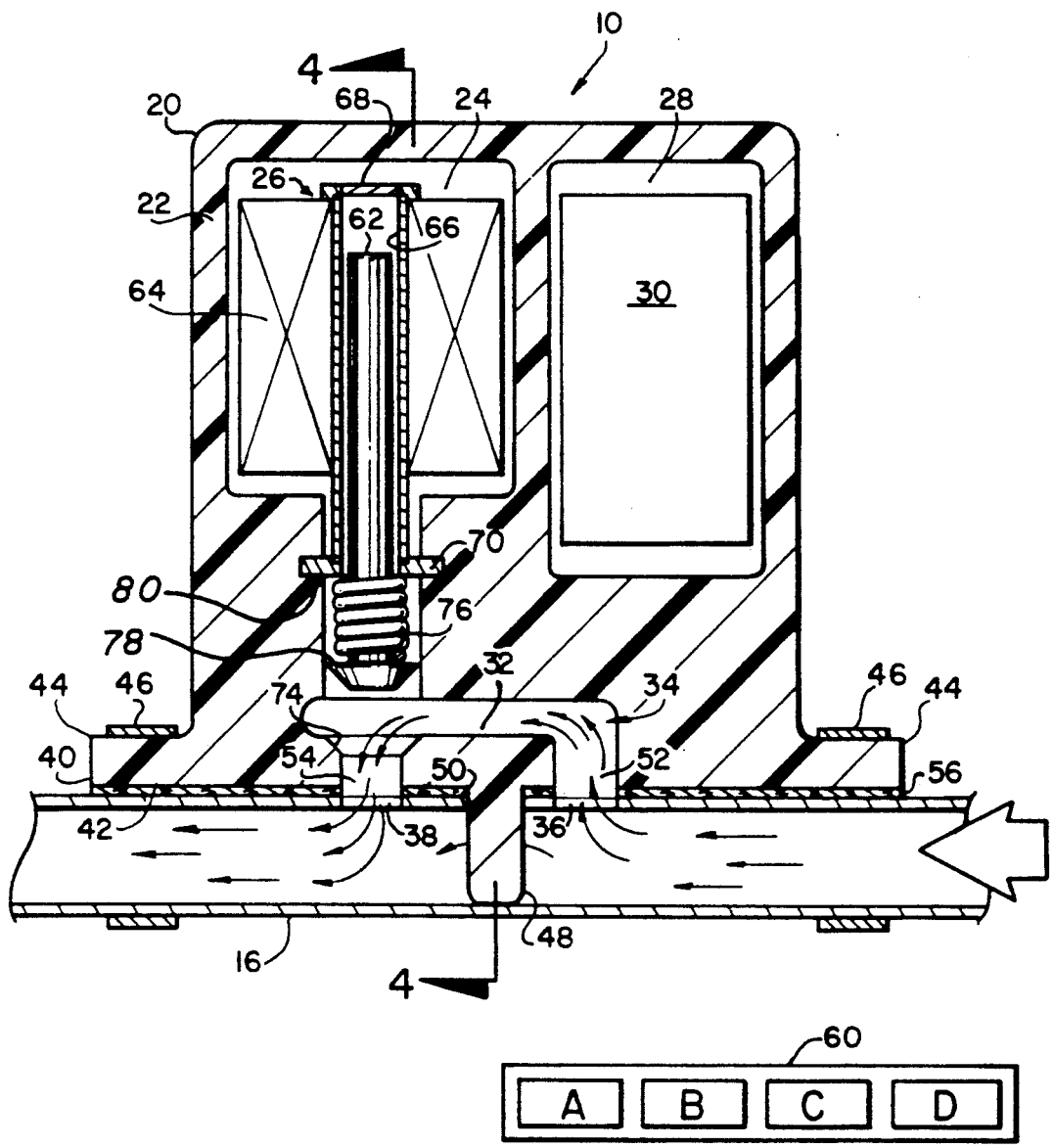
FIG. 2 is a view in vertical section of the invention apparatus, showing the bypass open.
Figure 3:
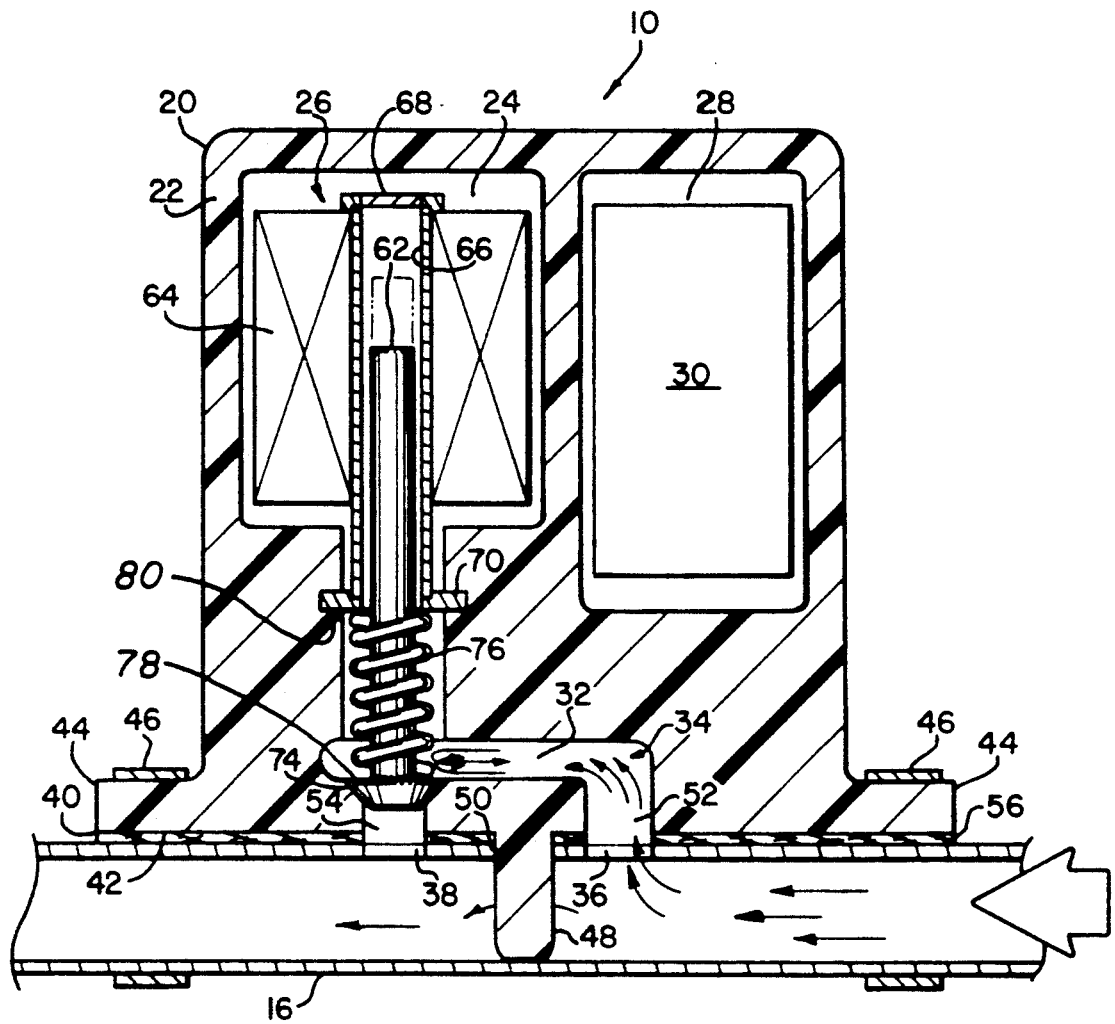
FIG. 3 is a view like FIG. 2, showing the bypass closed.
Figure 3:
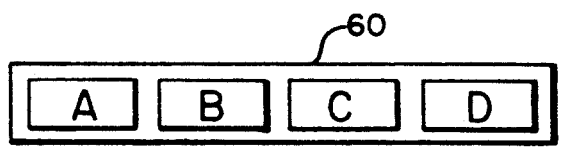

In FIGS. 2 and 3 the apparatus 10 is shown installed and in open and closed condition respectively. In FIG. 2, the apparatus 10 is seen to comprise a generally rectangular body 20 molded of suitable plastic to form a housing 22 having a first chamber 24 in which a solenoid means 26 is located, to be hereinafter described in detail, and longitudinally of the first chamber, a second chamber 28 in which a controller 30 is located, also to be hereinafter described in detail, and laterally of the first and second chambers a longitudinally extended third chamber 32. This last chamber 32 defined by the housing 22 forms the major portion of the bypass 34 as will be seen.

Figure 4:
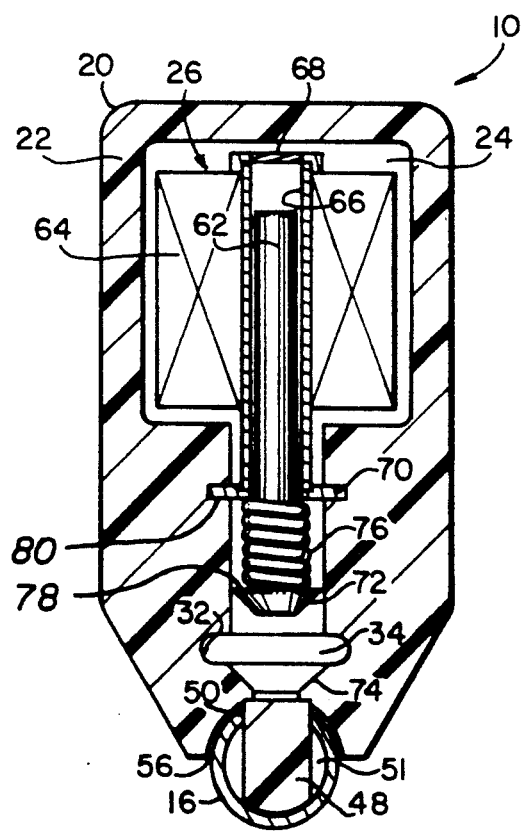
FIG. 4 is a view taken on line 4—4 in FIG. 2.

The chamber 32 portion of the bypass 34 is desirably of substantially the same cross-section, or of greater cross-section than the fuel line 16 so that diverting the fuel through the chamber 32 will not result in any diminution in flow rate of fuel. It is noteworthy, with particular reference to FIG. 4, that in the apparatus embodiment shown the cross-sectional parity is maintained while simultaneously providing a short travel for the solenoid operated plunger—across the chamber 32, as will be hereinafter explained, by substantially lowering the height of the chamber 32 and increasing its width in compensation therefor, relative to the generally circular fuel line 16.

Bypass 34 includes an entry port 36 and spaced therefrom across the length of chamber 32 an exit port 38, both formed at the outer side of chamber 32. It will be noted that the side 40 of body 20 where ports 36, 38 pierce the chamber 32 wall 42 is recessed along its length and generally conforms to the configuration of the fuel line 16, See FIGS. 2 and 4. Mounting shoulders 44 at either end of the body 20, and suitably integrally formed therewith, extend beyond the body and also conform to the fuel line 16 shape. Shoulders 44 are adapted to receive and retain conventional hose clamps 46 so as to attach the body 20 to the fuel line 16.

The body 20 at the recessed side 40, and between the ports 36, 38, provides a primary plug 48, suitably integrally molded with the body 20, but attached in some manner to the body, and held securely for insertion and use as now to be described. The plug 48 is inserted through a suitably sized aperture 50 in the fuel line 16. The plug 48 thus inserted substantially fills the cross-section of the fuel line 16, save for small crescent passes 51 at the sides of the plug. Fuel passing in such crescent passes 51 is insufficient to power the vehicle engine, so that when the plug 48 is in place, the vehicle will not operate.

As noted, the fuel line 16 is apertured at places before and behind (relative to fuel flow direction) the plug 48 receiving aperture 50, at 52 and 54, respectively. The apertures 52, 54 are located to be in registration with the entry port 36 and exit port 38 respectively, as shown. A fuel-resistant gasket 56 is placed between the fuel line 16 and the body 20 against fuel leaks.

The attached body 20 thus provides via entry port 36, chamber 32 defining the bypass 34 and exit port 38 a flow path around the portion of the fuel line 16 blocked by the plug 48. The presence of the plug 48 causes the fuel to flow preferentially into the chamber 32.

Once in the chamber 32 the flow of fuel can be controlled in accordance with the invention and unauthorized operation of the vehicle prevented, as will now be described.

The flow of fuel through the bypass 34 is controlled by controller 30, which acts upon the solenoid 26. Controller 30 is an electronically operated switch which controls current to the solenoid responsive to instructions received from digital keypad 60. The solenoid 26 is arranged to retract or extend plunger 62 responsive to current flow in solenoid windings 64. The plunger 62 is encased in a dielectric sleeve 66 having conductive circular end cap 68 at its upper end and a conductive annular end cap 70 at its lower end. Plunger 62 is provided with an end plug 72 which can be integral therewith or affixed. In either event the plug 72 is shaped to closely interfit with the mouth 74 of exit port 38 when plunger 62 is fully descended. Plunger 62 is spring loaded with a compression spring 76 extending between the upper side of shoulder 78 of plug 72 and the lower side of shoulder 80 of the sleeve lower cap 70. The spring 76 acts to drive the plunger 62 down into seating engagement of plug 72 with exit port mouth 74. With the plug 72 seated the fuel flow through the bypass 34 is shut off. The plug 72 is seated when there is no current flow to the solenoid 26. The controller 30 controls the current flow from a source such as a car battery, not shown, to the solenoid.

The apparatus 10 once installed as shown diverts, with fuel line plug 48, the flow of fuel from the fuel line 16 into the apparatus; specifically the fuel flows into entry port 36 through bypass 34 and out exit port 38. The solenoid plunger 62 is continuously retracted by current in the solenoid windings 64. This is the operating mode of the apparatus 10. When the vehicle is parked and it is secured against theft, the apparatus is placed in its parked mode. In this mode, current to the solenoid 26 is cut off, the spring 76 biases the plug 72 to close off the exit port 38. No fuel will flow. An attempted theft will use whatever residual fuel there is in the fuel line 16 ahead of the apparatus 10 and then the engine will stall since the fuel flow through crescent passages 51 will not sustain vehicle operation.

Upon the proper operator returning to the vehicle, the shut-off is reversed as follows. A predetermined code, suitably an alphanumeric combination of letters, e.g. A B C D or A1 B1 input to the controller 30 via keypad 60 is used to reverse the fuel shut off. The controller 30 is programmed to permit current flow to the solenoid 26 upon receiving a signal in the form of the predetermined combination of letters and/or numbers in appropriate sequence. Once this code is entered and current is received, the solenoid will retract the plunger 62 and the fuel line will be opened. The vehicle can be operated. Only the authorized user will know the appropriate sequence of letters and/or numbers. The controller 30 interprets the sequence of letters and/or numbers input to it as a signal that an authorized use condition exists and it permits vehicle operation.

No code input, or the wrong code input, on the other hand is interpreted as a nonauthorized use condition and vehicle operation is blocked.

In cases of parking where there are attendants who necessarily must move the vehicle, the controller can be further programmed to maintain current flow to the solenoid 26, although the vehicle ignition is repeatedly shut off, thereby maintaining vehicle operability.

The foregoing objects of providing a vehicle theft deterrent in which the fuel supply to the vehicle engine is interrupted, limiting drastically the speed and distance a car can achieve, one which is simple in design, easy and inexpensive to install, rugged, reliable, and simple to operate, and which has a controllable bypass of the vehicle fuel system which blocks fuel to the engine unless a coded authorization is given to unlock the system are thus met.

I claim:

1. Vehicle theft deterrent apparatus for liquid fuel powered vehicles having an engine, a liquid fuel supply and a fuel line defining a fuel path between said engine and said fuel supply, said apparatus comprising a bypass, means redirecting said fuel path through said bypass, said fuel redirecting means including a fuel line plug substantially blocking said fuel line in favor of said bypass, a housing attached to said fuel line, said housing having entry and exit ports registerable with openings made in said fuel line on opposite sides of said fuel line plug, said bypass extending between said ports, and means to close said by bypass in the absence of a signal of authorized use.

2. Vehicle theft deterrent apparatus according to claim 1, in which said engine is an internal combustion engine and said fuel is a hydrocarbon fuel.

3. Vehicle theft deterrent apparatus according to claim 1, in which said bypass closing means comprises a bypass plug blocking fuel flow through said bypass.

4. Vehicle theft deterrent apparatus according to claim 3, in which said bypass closing means is electrically movable.

5. Vehicle theft deterrent apparatus according to claim 4, in which said bypass closing means comprises a solenoid operated plunger carrying said bypass plug.

6. Vehicle theft deterrent apparatus according to claim 1, including also a controller responsive to a signal of the existence of an authorized use condition of said vehicle to actuate said bypass closing means to open said bypass.

7. Vehicle theft deterrent apparatus according to claim 6, including also input means to said controller for input of an authorization code into said controller.

8. Vehicle theft deterrent apparatus for liquid fuel powered vehicles having an engine, a liquid fuel supply and a fuel line defining a fuel path between said engine and said fuel supply, said apparatus comprising a bypass, means redirecting said fuel path through said bypass, said fuel redirecting means including a fuel line plug substantially blocking said fuel line in favor of said bypass, said bypass extending between said ports, said fuel line having a given height dimension and given cross sectional area, lower height, and means to close said by bypass in the absence of a signal of authorized use.

9. Vehicle theft deterrent device according to claim 8, in which said bypass closing means comprises a solenoid operated plunger carrying a bypass plug, said solenoid having a travel distance capability sufficient to carry said plug across the height of said bypass, said travel distance being less than the height of said fuel line.

10. Vehicle theft deterrent apparatus for liquid fuel powered vehicles having an engine, a liquid fuel supply, and a fuel line defining a fuel path between said engine and said fuel supply, said fuel line being selectively apertured with forward, rearward and center apertures along said fuel path, said apparatus being mounted to said fuel line and comprising a housing defining a bypass for said fuel line with entry and exit ports arranged to register with said forward and rearward fuel line apertures, and primary plug means inserted in said fuel line central aperture for redirecting fuel from said fuel line into said bypass entry port, secondary plug means carried by said housing and movable between bypass closing and bypass opening positions, and control means acting on said secondary plug means responsive to a predetermined signal of the existence of a condition of authorized vehicle use to open said bypass to fuel flow and conversely to not open said bypass to fuel flow in the absence of said signal, whereby said vehicle engine is inoperable for lack of sufficient fuel in the absence of an authorized use condition being signaled.

11. Vehicle theft deterrent apparatus according to claim 10, in which said primary plug means is carried by said housing.

12. Vehicle theft deterrent apparatus according to claim 10, including also mounting shoulders attached to said housing and adapted to mount said housing to said fuel line.

13. Vehicle theft apparatus according to claim 10, including also a solenoid operated plunger carrying said secondary plug means for movement responsive to said control means.

14. Vehicle theft deterrent apparatus according to claim 13, in which said plunger is enclosed within a nonconductive sleeve having conductive end caps.

15. Vehicle theft deterrent apparatus according to claim 10, in which said housing exit port includes a recessed opening outward from said bypass within said housing, said secondary plug means being conformed to interfit with said exit port opening.

16. Vehicle theft deterrent apparatus according to claim 10, in which said bypass has substantially the same cross-sectional area as said fuel line, but a lower height.

17. Vehicle theft deterrent device apparatus according to claim 16, in which said secondary plug means is carried on a solenoid operated plunger for travel a distance substantially the same as the height of said bypass to have secondary plug traverse said bypass to interfit with said exit port opening, said travel distance being less than the height of said fuel line.

18. Vehicle theft deterrent apparatus according to claim 17, including also mounting shoulders attached to said housing and adapted to mount said housing to said fuel line.

19. Vehicle theft apparatus according to claim 18, including also a solenoid operated plunger carrying said secondary plug means for movement responsive to said control means.

20. Vehicle theft deterrent apparatus according to claim 19, in which said plunger is enclosed within a nonconductive sleeve having conductive end caps.

21. Vehicle theft deterrent apparatus according to claim 20, in which said housing exit port includes a recessed opening outward from said bypass within said housing, said secondary plug means being conformed to interfit with said exit port opening.

22. Vehicle theft deterrent apparatus according to claim 21, in which said secondary plug means is clear of said bypass in the bypass open condition of said apparatus.

23. Vehicle theft deterrent apparatus comprising a generally rectangular body forming a housing having a first chamber within which there is located a solenoid operated plunger, said plunger carrying an exit port plug, a longitudinally adjacent second chamber within which there is located a controller, and a laterally adjacent, elongated third chamber comprising a fuel bypass and having spaced apart exit and entry ports extending through a longitudinal side wall of the housing, said exit port being opposed to said exit port plug carried on said plunger, said housing being inwardly recessed along its said longitudinal side wall to bodily receive a fuel line, a fuel line-blocking plug formed within said recessed housing wall in line with said housing entry and exit ports and therebetween, said plug being adapted to substantially restrict fuel flow in said fuel line when inserted in said fuel line in a first opening made therein, said entry and exit ports being registerable with separate second and third openings made in said fuel line, said fuel line plug acting to redirect fuel line fuel into said third chamber via its entry port, said fuel exiting said third chamber via its exit port in an authorized use condition of said vehicle, and corresponding retracted position of said exit port plug but not exiting said third chamber in a nonauthorized use condition of said vehicle and corresponding extended position of said exit port plug into said exit port, and means determining the use authorization condition of said vehicle comprising an authorization code input device, and means to generate a signal to retract said solenoid operated plunger and exit port plug carried thereon to open said elongated chamber to fuel flow in bypassing relation around said fuel line plug in response to entry of a predetermined code, but not otherwise.

* * * * *